United States Patent
Schulz et al.

(10) Patent No.: US 11,379,584 B2
(45) Date of Patent: Jul. 5, 2022

(54) DETECTION OF HARMFUL PROCESS INTENT IN AN INTENT-BASED PRODUCTION PROCESS

(71) Applicant: ABB Schweiz AG, Baden (CH)

(72) Inventors: Dirk Schulz, Meckenheim (DE); Raoul Jetley, Karnataka (IN)

(73) Assignee: ABB Schweiz AG, Baden (CH)

( * ) Notice: Subject to any disclaimer, the term of this patent is extended or adjusted under 35 U.S.C. 154(b) by 120 days.

(21) Appl. No.: 16/886,794

(22) Filed: May 29, 2020

(65) Prior Publication Data

US 2020/0380126 A1 Dec. 3, 2020

(30) Foreign Application Priority Data

May 31, 2019 (EP) .................................. 19 177 655

(51) Int. Cl.
G06F 21/56 (2013.01)
G06F 21/54 (2013.01)
G06F 21/57 (2013.01)

(52) U.S. Cl.
CPC ............ *G06F 21/563* (2013.01); *G06F 21/54* (2013.01); *G06F 21/568* (2013.01); *G06F 21/577* (2013.01)

(58) Field of Classification Search
CPC ...... G06F 21/563; G06F 21/54; G06F 21/568; G06F 21/577
See application file for complete search history.

(56) References Cited

U.S. PATENT DOCUMENTS

| 5,402,367 | A | * | 3/1995 | Sullivan | G05B 19/4188 703/6 |
|---|---|---|---|---|---|
| 2009/0049514 | A1 | * | 2/2009 | Yan | G06F 21/445 726/1 |
| 2017/0364053 | A1 | | 12/2017 | Hadeli et al. | |
| 2019/0121972 | A1 | | 4/2019 | Norvill et al. | |
| 2019/0196422 | A1 | * | 6/2019 | Kai | G05B 17/02 |

FOREIGN PATENT DOCUMENTS

EP 0643344 A1 3/1995

* cited by examiner

*Primary Examiner* — Paul E Callahan
(74) *Attorney, Agent, or Firm* — Leydig, Voit & Mayer, Ltd.

(57) ABSTRACT

A method for detection of harmful process intent in an intent-based production process includes: providing a machine-readable production model linking an intent model, correlating to process intent, including production process functions, constraints on measurable properties on the production process functions, and/or production process function sequences required for the production process, and a process model, correlating to process knowledge comprising a production process behavior; determining a safety library of at least one safety process intent, the safety library being protected by security mechanisms to be maintained outside of regular intent-based engineering mechanisms and operation mechanisms; evaluating changes of process intent in view of potentially harmful process intent dependent on the at least one safety process intent; and providing a report of potentially harmful process intent for auditing based on the potentially harmful process intent.

13 Claims, 1 Drawing Sheet

DETECTION OF HARMFUL PROCESS INTENT IN AN INTENT-BASED PRODUCTION PROCESS

CROSS-REFERENCE TO PRIOR APPLICATION

Priority is claimed to European Patent Application No. EP 19 177 655.8, filed on May 31, 2019, the entire disclosure of which is hereby incorporated by reference herein.

FIELD

The invention relates to a method for detection of harmful process intent in an intent-based production process, a control device, a computer program and a computer-readable storage medium.

BACKGROUND

Automation systems are moving toward increasing degrees of autonomy, where operational target KPIs or product design specifications automatically cause the reconfiguration of the automation system based on codified knowledge about the production process. This intent-based approach represents a big quality improvement and a huge efficiency lever, but the same efficiency can be misguided on purpose by an attacker or on accident by mistake; a new attack surface is being opened up regarding functional safety and productivity.

SUMMARY

In an embodiment, the present invention provides a method for detection of harmful process intent in an intent-based production process, comprising: providing a machine-readable production model linking an intent model, correlating to process intent, comprising production process functions, constraints on measurable properties on the production process functions, and/or production process function sequences required for the production process, and a process model, correlating to process knowledge comprising a production process behavior; determining a safety library of at least one safety process intent, the safety library being protected by security mechanisms to be maintained outside of regular intent-based engineering mechanisms and operation mechanisms; evaluating changes of process intent in view of potentially harmful process intent dependent on the at least one safety process intent; and providing a report of potentially harmful process intent for auditing based on the potentially harmful process intent.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
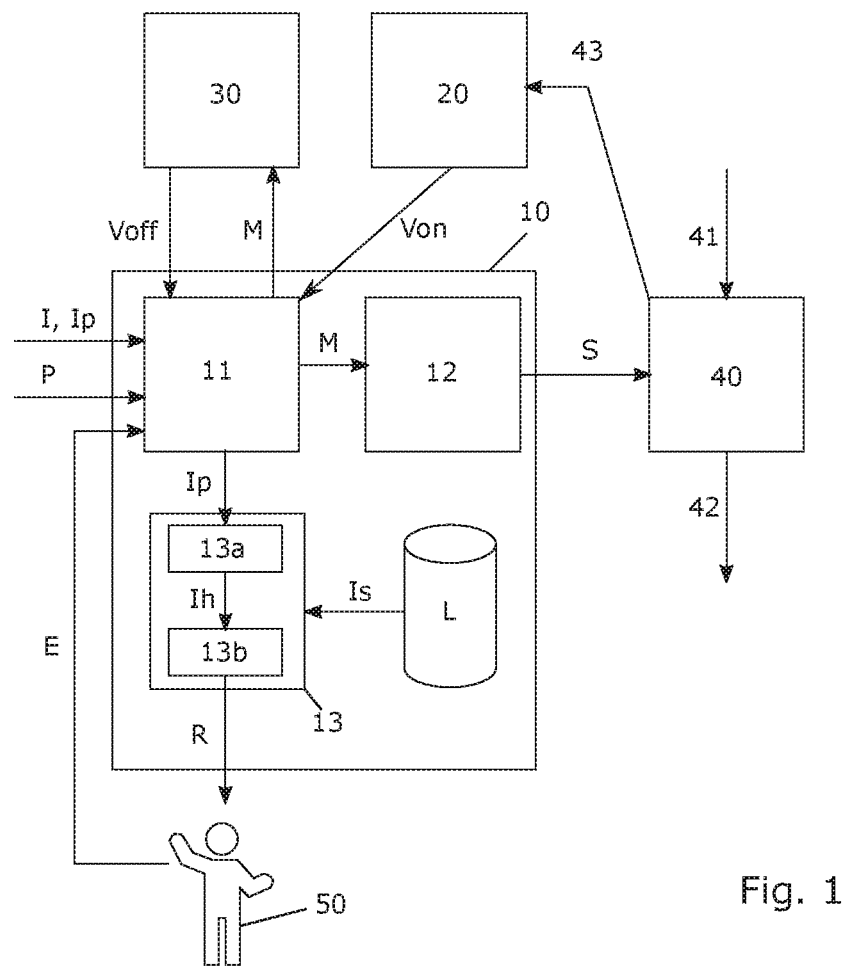
FIG. 1 schematically shows a control device.

In an embodiment, the present invention provides an improved intent-based production process, in which preferably harmful intent can be detected.

According to an aspect, a method for detection of harmful process intent in an intent-based production process, comprises the steps, providing a machine-readable production model linking an intent model, correlating to process intent, comprising production process functions, constraints on measurable properties on the production process functions and/or production process function sequences required for the production process, and a process model, correlating to process knowledge comprising a production process behavior, determining a safety library of at least one safety process intent, wherein the safety library is protected by security mechanisms to be maintained outside of regular intent-based engineering mechanisms and operation mechanisms, evaluating changes of process intent in view of potentially harmful process intent dependent on the at least one safety process intent, and providing a report of potentially harmful process intent for auditing based on the potentially harmful process intent.

The term "potentially harmful process intent and/or harmful process intent", as used herein, relates to process intent that leads to harm in the production process. In other words harmful process intent relates to production process functions, constraints on measurable properties on the production process functions and/or production process function sequences required for the production process, which may lead to endangering of productivity, like damage and/or destruction of production process products/material, and/or functional safety, like damage and/or destruction of hardware of the production process like a production process module of a production process plant that controls material, for example pumps, mixers, tanks, reactors, heat exchangers, etc. or the harm of human health or lives. The harmful process intent thereby covers process intent maliciously created or created by mistake.

The term "safety process intent", as used herein, relates to process intent, which is safety relevant for the production process. In other words safety process intent relates to production process functions, constraints on measurable properties on the production process functions and/or production process function sequences required for the production process, which are known to endanger productivity, like damage and/or destruction of production process products/material, and/or functional safety, like damage and/or destruction of hardware of the production process like a production process module of a production process plant that controls material, for example pumps, mixers, tanks, reactors, heat exchangers, etc. or the harm of human health or lives. In other words, the safety process intent functions as safety intent rules.

Preferably, evaluating the changes of the process intent comprises checking the changed process intent for potentially harmful process intent, thereby evaluating the potentially harmful process intent in view of the safety process intent in the safety library.

Changes of process intent preferably relates to reconfiguration and/or changing an engineering base-line to be deployed for the production process.

Preferably, safety process intent is used for safety protection and/or productivity protection.

Preferably, the safety library is externally provided.

Preferably, the production model is validated, preferably dependent on production process key performance indicators, in particular of the produced product, thereby determining validation data. Based on this validation data, process intent may be changed. This change of process intent is then checked for potentially harmful process intent.

During validation, it is preferably tested, whether the production process would exhibit any behavior violating the safety process intent.

Thus, core safety functions are separated outside of the scope of intent-based engineering.

Preferably, a dedicated set of safety intent rules, in particular to be used during validation, are defined. Those safety intent rules are not accessible in the regular engineering process.

Thus, an improved intent-based production process, in which preferably harmful intent can be detected, is provided.

In a preferred embodiment, the potentially harmful process intent comprises changes, in which a new process intent contradicts an existing process intent and/or changes, in which a new process intent contradicts a process intent that was removed in a previous change.

Thus, an improved intent-based production process, in which preferably harmful intent can be detected, is provided.

In a preferred embodiment, the method comprises the step of auditing the report of potentially harmful process intent manually by a process expert.

Preferably, the report is audited using a four-eye-principle, in particular by two process experts.

Thus, an improved intent-based production process, in which preferably harmful intent can be detected, is provided.

Preferably, auditing the report comprises accepting or rejecting potentially harmful process intent.

Thus, an improved intent-based production process, in which preferably harmful intent can be detected, is provided.

In a preferred embodiment, the safety library comprises a general safety library and a project-specific safety library.

For example, the library contains dangerous states for chemical reactions, what not to mix, which circumstances to always adhere to and/or what causes explosions or overheating.

Thus, an improved intent-based production process, in which preferably harmful intent can be detected, is provided.

In a preferred embodiment, the method comprises the step of automatically determining at least one safety process intent from the general safety library suitable for the production process as project-specific safety process intent for the project-specific safety library dependent on the current production process project.

Preferably, from the production process project, in particular a production process project file, it can be manually and/or automatically derived, which different steps the production process covers, for example which chemical reaction will take place.

Thus, an improved intent-based production process, in which preferably harmful intent can be detected, is provided.

In a preferred embodiment, the method comprises the step of categorizing the project-specific process intent in one of the categories "proven good intent", "proven negative impact" and/or "proven negative process behavior".

For example, process intent categorized as "proven negative impact" comprises a description that any temperature above 100° C. causes shutdown of the production process.

Thus, an improved intent-based production process, in which preferably harmful intent can be detected, is provided.

In a preferred embodiment, the method comprises the step of cryptographically securing the evaluation of the changes of the process intent.

Thus, an improved intent-based production process, in which preferably harmful intent can be detected, is provided.

In a preferred embodiment, the method comprises the step of continuously expanding the safety library based on checked changed project-specific process intent.

Thus, an improved intent-based production process, in which preferably harmful intent can be detected, is provided.

In a preferred embodiment, the method comprises the step of categorizing the potentially harmful intent in different harm levels and/or categories, preferably for illustration purposes in the report of potentially harmful process intent.

Thus, an improved intent-based production process, in which preferably harmful intent can be detected, is provided.

In a preferred embodiment, the method comprises the step of providing a general library of negative production intents.

Preferably, negative production intent comprises dangerous states, in particular for chemical reactions. In other words what not to mix, which circumstances to always adhere to and/or what causes explosion or overheating.

Thus, an improved intent-based production process, in which preferably harmful intent can be detected, is provided.

In a preferred embodiment, the method comprises the step of checking the potentially harmful intent based on virtual testing using a simulation model of the process.

Thus, malicious intent is detected as part of an automated intent validation process embedded into the engineering workflow. The safety process intent thus becomes constant part of the validation process.

Additionally, the virtual testing is used to check whether the simulated production process would exhibit any behavior violating the safety process intent.

Thus, an improved intent-based production process, in which preferably harmful intent can be detected, is provided.

According to another aspect, a control device is provided that is configured to execute a method, as described herein.

According to another aspect, a computer program is provided that when it is executed on a control device, as described herein, instructs the control device to execute steps of a method, as described herein.

According to another aspect, a computer readable storage medium is provided, being configured to store a computer program, as described herein.

The reference symbols used in the drawings, and their meanings, are listed in summary form in the list of reference symbols. In principle, identical parts are provided with the same reference symbols in the figures.

FIG. 1 shows a system comprising a device 10, a machine learning unit 20, a simulation unit 30 and a production process module 40.

The control device 10 comprises a model unit 11, a control unit 12 and a safety unit 13. The device 10 is provided with an intent model I and a process model P. The intent model I correlates to process intent Ip, comprising production process functions, constraints on measurable properties on the production process functions and/or production process function sequences required for the production process. The process model P correlates to process knowledge comprising a production process behavior. The model unit 11 determines a production model M linking the intent model I to the process model P.

Since the process intent Ip therefore is integrated into the production model M the so called intent-based engineering allows designers and operators to focus on "what" the process should do, in other words the objectives, not "how" this is to be achieved, in other words the implementation. By hiding the complexity of automation technology, intent-based automation enables non-automation experts to efficiently automate and optimize their processes from an operational perspective. Furthermore, formalized objectives can become subject to automated validation, and they serve to improve coverage of automated.

The production model M is provided to the control unit 12, which determines a control strategy S for controlling the production process module 40. The production process module 40 itself is a physical module that is provided with input material 41 and processes the input material 41 to an output material 42. While processing, several measurement data 43, like the temperature, can be obtained from the production process module 40.

The measurement data 43 is provided to the machine learning unit 20, which verifies and/or validates the present production model M, thereby generating online validation data Von. These online validation data Von are provided back to the model unit 11, which then adjusts the present production model M based on the online validation data Von. Therefore, the production model M can be iteratively improved.

Additionally, the production model M is provided to the simulation unit 30. The simulation unit comprises a digital twin of the production process module 40 and verifies and/or validates the present production model M, thereby generating offline validation data Voff. The offline validation data Voff is also provided back to the model unit 11, which then adjusts the present production model M based on the offline validation data Voff. Therefore, the production model M can be iteratively improved.

In an exemplary example, the production process module 40 is a fermentation tank.

The production process module 40 is supposed to be able to maintain a particular temperature and protect the fermentation process from overheating. This is achieved by describing causes and effects like opening a heating circuit if the temperature is too low or opening an emergency valve if it is too high. Encapsulating such basic equipment control and protection is the core feature of a production process module 40.

For the presumed fermentation process, the ideal temperature is 50° C., which is to be maintained for a duration of 2 days. A corresponding production sequence can be generated to maintain this process step for two days, parameterizing mixing and heating services of the tank module to maintain 50° C.

To achieve acceptable quality of the fermented product, the process may never exceed 70° C. or fall below 40° C. In the first case, the used yeast fungus will die off and the batch must be discarded. In the second case, the fungus will become inactive and fermentation will stop as well. However, unlike for overheating, the process can be continued by raising the temperature again provided reaction was not stopped for more than 2 h, because then the product has started to deteriorate. The module is configured to protect the process according to these limits, overwriting the given defaults.

Within the allowed temperature range, fermentation speed is also changing with the specific temperature. For each +1° C., 1 h production time can be gained. With this knowledge, production volume can be scaled up without compromising product quality.

Lastly, relevant information from process topology is captured. The fermentation tank requires an external heat source, which is provided by a second module, a heat exchanger. However, the actual intention is not to achieve a specific temperature within the heat exchanger, which is what the heat exchanger can directly measure, but to achieve a specific temperature within the fermentation tank, which is aware of its temperature, but not in direct control of the heat exchange process. This leads to an instability of temperature control. In consequence, knowing the rate at which fermentation time decreases with temperature is not enough to maximize production volume because at the edges of the good operating area, control instabilities will cause temperature to rise above the maximum allowed level and the batch will be lost. To be able to operate the process closer to its boundaries, temperature control must be stabilized e.g. by having the heat exchanger directly use the temperature measurement from the tank, but first of all, the impact that process connectivity has on control stability must be explicitly captured.

Traditional or modular engineering approach would have stated only the 50° C. setpoint and corresponding alarm limits. By combining the additional process knowledge in form of a process model P, which a process designer can easily capture on top of one or multiple modules, the production model M can be built that ties to process intent in form of the intent model I, such as production KPIs.

Without such optimization, the operating range of the process has to be determined by a series of trials and errors. This is typically done by an operator and process expert collaborating during the early production phase following initial plant start-up because no other codified information is available about the process behavior.

Based on the production model M, the automation system knows out of the box that production time can be reduced by 30% without any risk for product quality even without stabilized control; by also optimizing the stability of temperature control, production time can even be cut down safely to 50%. Secondly, the operational strategy S can be motivated by tracing the automated decisions back to process knowledge provided by a process expert in the same company.

Whenever a process intent Ip is changed, either by changing the provided intent model I or based on the online validation data Von and/or the offline validation data Voff, the changed process intent Ip is provided to the safety unit 13. The safety unit 13 comprises an evaluation unit 13a and a report unit 13b. The evaluation unit 13a checks the provided changed process intent Ip for potentially harmful intent Ih. Therefore, the evaluation unit 13a evaluates the changed process intent Ip in view of safety process intent Is, which is provided to the safety unit 13, in particular to the evaluation unit 13a by a safety library L. The safety process intent Is relates to production process functions, constraints on measurable properties on the production process functions and/or production process function sequences required for the production process, which are known to endanger productivity, like damage and/or destruction of production process products/material, and/or functional safety, like damage and/or destruction of hardware of the production process like a production process module of a production process plant that controls material, for example pumps, mixers, tanks, reactors, heat exchangers, etc. or the harm of human health or lives.

The determined potentially harmful intent Ih is then provided by the evaluation unit 13a to the report unit 13b. The report unit 13b determines a report R for auditing, presenting the determined potentially harmful intent Ih. This report R is provided to a technical expert 50, in particular a safety expert for auditing. Thus, safety critical changes of the process intent Ip are not automatically approved, but have to be approved manually. The technical expert 50 then reads the report R and decides if the potentially harmful intent Ih indeed is harmful for the process or can be approved. If the technical expert 50 approves the changes of the process intent Ip, the intent model I, which correlates to the process intent Ip, is adjusted accordingly. Otherwise, the changes of the process intent Ip are dismissed. The information about the decision of the technical expert 50 is included in evaluation data E, which is provided by the technical expert 50 to the model unit 11, in particular via a human-machine interface of the control device 10.

Figure 2:
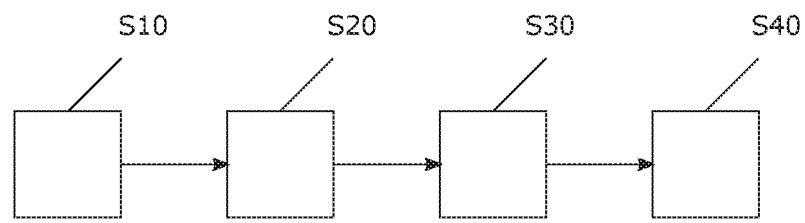
FIG. 2 shows a flow chart of a method for detection of harmful process intent in an intent-based production process.

FIG. 2 shows a flow chart of a method for detection of harmful process intent in an intent-based production process.

In step S10, a machine-readable production model M linking an intent model I, correlating to process intent Ip, comprising production process functions, constraints on measurable properties on the production process functions and/or production process function sequences required for the production process, and a process model P, correlating to process knowledge comprising a production process behavior is provided.

In step S20, a safety library L of at least one safety process intent is determined, wherein the safety library L is protected by security mechanisms to be maintained outside of regular intent-based engineering mechanisms and operation mechanisms.

In step S30, changes of process intent Ip are evaluated in view of potentially harmful process intent Ih dependent on the at least one safety process intent Is.

In step S40, a report of potentially harmful process intent Ih is provided for auditing based on the potentially harmful process intent Ih.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS 10 control device
11 model unit
12 control unit
13 safety unit
13a evaluation unit
13b report unit
20 machine learning unit
30 simulation unit
40 production process module
41 input material
42 output material
43 measurement data
Von online validation data
Voff offline validation data
I intent model
P process model
M production model
S control strategy
Ip process intent
Is safety process intent
Ih potentially harmful intent
R report
E evaluation data
S10 providing a machine-readable production model
S20 determining a safety library
S30 evaluating changes of process intent
S40 providing a report of potentially harmful process intent

What is claimed is:

1. A method for detection of harmful process intent in an intent-based production process, comprising:
providing a machine-readable production model linking an intent model, correlating to process intent, comprising production process functions, constraints on measurable properties on the production process functions, and/or production process function sequences required for the production process, and a process model, correlating to process knowledge comprising a production process behavior;
determining a safety library of at least one safety process intent, the safety library being protected by security mechanisms to be maintained outside of regular intent-based engineering mechanisms and operation mechanisms, wherein the safety library comprises a general safety library and a project-specific safety library;
evaluating changes of process intent in view of potentially harmful process intent dependent on the at least one safety process intent;
providing a report of potentially harmful process intent for auditing based on the potentially harmful process intent, and
further comprising automatically determining at least one safety process intent from the general safety library suitable for the production process as project-specific safety process intent for the project-specific safety library dependent on the current production process project.

2. The method of claim 1, wherein potentially harmful process intent comprises changes in which a new process intent contradicts an existing process intent and/or changes in which a new process intent contradicts a process intent that was removed in a previous change.

3. The method of claim 1, further comprising auditing the report of potentially harmful process intent manually by a process expert.

4. The method of claim 1, further comprising categorizing the project-specific safety process intent in one of the categories "proven good intent," "proven negative impact," and/or "proven negative process behavior."

5. The method of claim 1, further comprising cryptographically securing the evaluation of the changes of the process intent.

6. The method of claim 1, further comprising continuously expanding the safety library based on checked changed project-specific safety process intent.

7. The method of claim 1, further comprising categorizing the potentially harmful intent in different harm levels and/or categories.

8. The method of claim 7, wherein the categorizing the potentially harmful intent in different harm levels and/or categories is for illustration purposes in the report of potentially harmful process intent.

9. The method of claim 1, further comprising providing a general library of negative production intents.

10. The method of claim 1, further comprising checking the potentially harmful intent based on virtual testing using a simulation model of the process.

11. A control device comprising a computer processor configured to execute a method for detection of harmful process intent in an intent-based production process, the method executed by the computer processor comprising:

provinding a machine-readable production model linking an intent model, correlating to process intent, comprising production process functions, constraints on measurable properties on the production process functions, and/or production process function sequences required for the production process, and a process model, correlating to process knowledge comprising a production process behavior;

determining a safety library of at least one safety process intent, the safety library being protected by security mechanisms to be maintained outside of regular intent-based engineering mechanisms and operation mechanisms, wherein the safety library comprises a general safety library and a project-specific safety library;

evaluating changes of process intent in view of potentially harmful process intent dependent on the at least one safety process intent;

providing a report of potentially harmful process intent for auditing based on the potentially harmful process intent, and further comprising automatically determining at least one safety process intent from the general safety library suitable for the production process as project-specific safety process intent for the project-specific safety library dependent on the current production process project.

12. A computer program stored on a tangible, non-transitory storage medium that when executed on the control device of claim 11 instructs the control device to execute steps of the method.

13. A computer readable storage medium configured to store the computer program of claim 12.

* * * * *